United States Patent [19]

Mizioch

[11] Patent Number: 5,240,032
[45] Date of Patent: Aug. 31, 1993

[54] STABILIZER BAR

[76] Inventor: Gregory J. Mizioch, 15436 N. Central Ave., Phoenix, Ariz. 85022

[21] Appl. No.: 127

[22] Filed: Jan. 4, 1993

[51] Int. Cl.$^5$ .............................................. F16L 5/00
[52] U.S. Cl. .................................... 137/368; 248/70; 248/354.4; 248/694
[58] Field of Search ................ 251/291; 137/364, 368, 137/363, 365–367; 248/694, 70, 74.1, 354.4

[56] References Cited

U.S. PATENT DOCUMENTS

| | | | |
|---|---|---|---|
| 3,079,125 | 2/1963 | Tischler et al. | 137/368 |
| 3,961,528 | 6/1976 | Ford | 137/364 |
| 4,389,034 | 6/1983 | Suttles | 248/74.1 |
| 4,717,099 | 1/1988 | Hubbard | 248/74.1 |
| 4,729,532 | 3/1988 | Moss | 248/74.1 |
| 4,915,125 | 4/1990 | Lester | 137/368 |
| 4,989,634 | 2/1991 | Rieseck | 137/363 |

Primary Examiner—A. Michael Chambers
Attorney, Agent, or Firm—Cahill, Sutton & Thomas

[57] ABSTRACT

A stabilizer bar (26) is employed to stabilize an elongated valve stem extension (22) for a buried valve (11). The stabilizer bar includes telescoping sections (27, 28) providing adjustment to accommodate different diameter manholes (14). A bearing member (36) engageable with the valve extension is laterally movable to accommodate misalignment between the valve and the manhole.

5 Claims, 1 Drawing Sheet

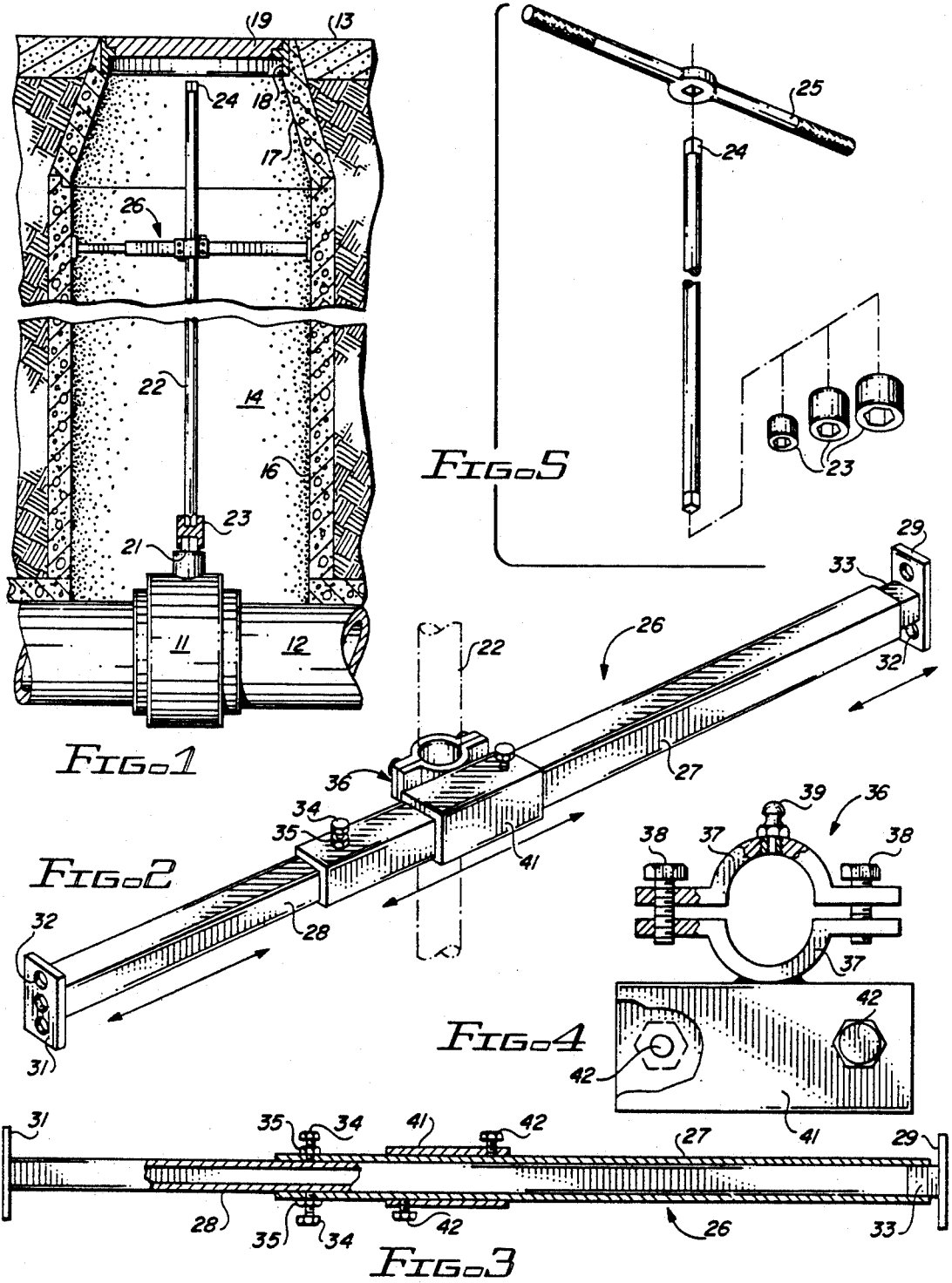

STABILIZER BAR

TECHNICAL FIELD

This invention has to do with manipulation of shut-off valves which are located in manholes considerable distances below grade.

BACKGROUND ART

Municipal water supply systems usually bury their mains under public rights of way, such as streets or sidewalks. At spaced intervals throughout the system normally open, shut-off valves are incorporated for the purpose of isolating main breaks so they can be repaired.

These shut-off valves are frequently buried several feet beneath street grades in the lower-most regions of manholes. Manholes for the valves typically will be provided by cylindrical concrete casings having an internal diameter sufficient to permit a worker in the manhole to effect repairs of the valve. The more or less standard manhole casing has a lower internal diameter of approximately five feet and is topped by a cone tapering inwardly and upwardly to the size of a standard manhole cover. Manhole casings may be provided in different sizes and even so-called standard casings may vary in diameter by as much as several inches due to imprecise casting.

It is desirable to provide for manipulation of each shut-off valve between its "off" and "on" positions by a person at street level, in other words, without having to descend into the manhole. And, this requires that an extension be provided for the valve stem which is normally no more than a few inches to one foot long. Without some form of stabilization, a lengthy stem extension for a deeply buried valve has a tendency to flop around in the sizable manhole, making manipulation of the valve difficult.

Leo M. Lester, in his U.S. Pat. No. 4,915,125, granted Apr. 10, 1990, for "Valve Stem Extension Assembly" discloses a system for supporting a very long heavy valve stem extension within a support casing surrounding the extension. He proposes to bolt a series of bushing carrying brackets to the casing. The stem extension carries a series of collars which rest on the bushings and transfer the weight of the extension to the brackets. The assembly taught by this patent has no provision for adjustment of the brackets to accommodate different size casings or misaligned extensions.

U.S. Pat. No. 3,961,528, granted Jun. 8, 1976, to Stanley W. Ford for "Meter Setting Device" discloses the use of an extensible tubular member for supporting a water meter within a cement meter box. Although adjustable as to length, the tubular member must be custom fabricated to match each individual meter installation.

Similarly, U.S. Pat. No. 4,989,634, granted Feb. 5, 1991, to Raymond J. Rieseck for "Fuel Dispenser Catchment Box" discloses the use of an extensible supporting clamp for stabilizing an upwardly extending fuel pipe within a catchment. But, the apparatus disclosed makes no provision for compensating for misaligned piping.

There continues to be a need for a versatile, easily installed, stabilizer bar for stabilizing lengthy valve stem extensions within a manhole.

DISCLOSURE OF THE INVENTION

The stabilizer bar of this invention constitutes an improvement over previously proposed systems in that it readily and easily accommodates manhole casings of different diameters and misaligned valves; that is, valves whose stems are not concentrically positioned within the manhole casing.

This versatility is achieved by constructing the stabilizer bar of first and second telescoping sections having associated therewith means for releasably holding the sections in selected position relative to each other. These features permit the bar to be installed in manhole casings of different internal diameters.

Another feature of the improved stabilizer bar contemplates mounting an extension-embracing bearing member on a sleeve which is slidable along to a releasably locked position on one of the telescoping sections. This provides for accommodation of misaligned valve stems. And, lastly, the bearing member has separable components to facilitate installing the bearing member around the stem extension.

Secondary, although important, features of the improved stabilizer bar include support plates at the distal ends of the telescoping sections, one of which support plates is separable from its telescoping section. This permits that plate to be installed on the casing without having to initially support the bulk and weight of the remainder of the stabilizer bar, thus simplifying the installation. And, the telescoping sections in the bearing member sleeve are all preferably fabricated from rectangular tubing for added strength and rigidity.

BRIEF DESCRIPTION OF THE DRAWINGS

The invention is described in greater detail hereinafter by reference to the accompanying drawings, wherein:

FIG. 1 is a vertical sectional view through a manhole in which the stabilizer bar of this invention is employed to stabilize a valve stem extension of a valve positioned in the manhole;

FIG. 2 is an enlarged perspective view of the stabilizer bar;

FIG. 3 is an elevational view of the stabilizer bar with portions broken away to show the interior;

FIG. 4 is an enlarged plan view of bearing member and mounting sleeve components of the stabilizer bar; and FIG. 5 is an exploded perspective view of a valve stem extension system of the type that requires stabilization.

BEST MODE FOR CARRYING OUT THE INVENTION

Referring particularly to FIG. 1, the numeral 11 designates a water shut-off valve in a water main 12 buried beneath a street 13. The upper surface of street 13 is considered to be "grade" with the valve 11 being disposed several feet below grade, say anywhere from five to twenty feet below grade.

Access to valve 11 for repair, replacement and manipulation is provided by a manhole 14 provided by one or more cylindrical sections of casing 16 and a cone 17 on top of the casing. Casing section 16 and cone 17 are preferably formed of cast concrete which may be rough and uneven since the primary requirement for the manhole casing is strength, not aesthetics. Manhole cone 17 is usually topped with a metal ring 18 sized to receive a manhole cover 19.

If shut-off valve 11 is disposed a significant distance below grade, it could be directly manipulated through its short operating stem 21 only by workmen entering the manhole 14. This is laborious and timeconsuming and it is therefore desirable to provide for the valve 11 to be manipulated from grade level. Such provision can be made by installing a valve stem extension 22 extending upwardly from valve 11 to near the top of the manhole 14.

Valve stem extension 22 is preferably equipped with a socket0 head 23 at its lower end which is sized to fit closely over valve stem 21. The upper end of the valve stem extension 22 possesses a noncircular fitting 23 receivable in a manipulating tool, or lever, 24 (see FIG. 5).

Because of the length of stem extension 22, the fairly loose connection between the extension socket head 23 and the valve stem 21 and the width of the manhole 14, there is a tendency for the extension to flop over to the side of the manhole. This can make it difficult for a worker to manipulate the valve 11 from the lever 25 at the upper end of the stem extension 22. And, this is the problem that is solved by this invention.

This invention contemplates stabilizing the valve stem extension 22 in an upright position through the installation of a stabilizer bar indicated generally by the reference numeral 26. The stabilizer bar includes first and second elongated telescoping sections 27 and 28 (see FIGS. 2 and 3). These sections are preferably formed from rectangular tubing of galvanized cold rolled steel. For most applications, a 1.75 inch×1.75 inch tube having wall thickness of 0.09 inch is employed for section 28 and will slide freely within a first section made from 2 inch by 2 inch tube having a wall thickness of 0.019 inch.

The purpose of providing telescoping sections 27 and 28, of course, is to permit the overall length of the stabilizer bar 26 to be adjusted to accommodate manholes having different diameter casings. It is desirable for the ends of the stabilizer bar to firmly abut the inner surface of the manhole casing so that the stabilizer bar can be held firmly in place within the manhole.

The distal end of each extension section 27 and 28 preferably carries a vertical support plate designated 29 and 31, respectively. Both support plates have openings 32 therethrough through which bolts (not shown) can be driven into the wall of the casing 16.

Support plate 29 preferably has a stud 33 secured to the face thereof and sized to slide in and out of the open distal end of telescoping section 27. The removability of support plate 29 from the remainder of the stabilizer bar 26 facilitates installation of the bar. Support plate 29 can be removed from section 27 and held against the wall of the casing 16 while bolts are placed therethrough without the encumbrance of the weight and bulk of the remainder of the stabilizer bar. When support plate 29 has been secured in place, the end of telescoping section 27 can be slipped over the stud 33 on plate 29 and telescoping section 28 extended from section 28 to bring support plate 31 in contact with an opposition wall of casing 16. Support plate 31 is preferably firmly fastened, as by welding, to the distal end of telescoping section 28.

The stabilizer bar is preferably equipped with means for holding the first and second telescoping sections 27 and 28 of the stabilizer bar 26 in the selected position relative to each other with their support plates 29 and 31 in contact with the wall of the casing 16. This means may take the form of oppositely directed cap screws 32 installed in nuts 35 welded on opposite sides of telescoping section 27 over openings provided in that section. Tightening cap screws 34 into frictional engagement with the wall of telescoping section 28 holds the sections 27 and 28 in the selected relative position.

For engagement with the valve stem extension 22, the stabilizer bar is provided with a bearing member, designated generally by reference numeral 36. Bearing member 36 has a vertically positioned cylindrical inner surface provided by a pair of flanged semicylindrical segments 37 (see FIG. 4). Bearing member segments 37 are held together by a pair of bolts 38. Removal of bolts 38 permits the bearing member segments 37 to be separated so they can be positioned around the valve stem extension 22. One of the bearing member segments 37 may, if desired, be provided with a grease nipple 39 to permit the contacting surfaces of the bearing member 36 and the stem extension 22 to be lubricated.

Shut-off valves 11 are not always perfectly aligned with the central axis of the manhole 14. It is desirable, therefore, that the bearing member 36 be laterally adjustable along the length of the stabilizer bar to compensate for such valve misalignment. And, this is accomplished by mounting, as by welding, the bearing member 36 on a slidable sleeve member 41. Sleeve member 41 is also fabricated from rectangular tubing sized to slide freely on telescoping section 27.

Sleeve member 41 is preferably equipped with means for releasably holding it in a fixed position along telescoping section 27. This means may take the form of a pair of cap screws 42 threaded into tapped openings on opposite sides of the sleeve member. When tightened, the cap screws 42 frictionally engage telescoping section 27 and hold the bearing member in a selected position on that section.

From the foregoing, it should be apparent that this invention provides a versatile and reliable, but easily installed, stabilizer bar for valve stem extensions.

What is claimed is:

1. A stabilizer bar for a valve stem extension, said bar comprising first and second elongated telescoping sections, means for releasably holding said first and second sections in a selected position relative to each other, a sleeve member slidably mounted on one of said telescoping sections, means for releasably holding said sleeve member in a selected position on the telescoping section on which it is mounted, and a bearing member mounted on said sleeve member, said bearing member being sized to closely encircle the stem extension and having separable components to facilitate placement of the extension within the bearing member.

2. The stabilizer bar of claim 1, further comprising a pair of support plates at the respective distal ends of said first and second telescoping sections, at least one of said support plates being separable from its respective telescoping section to facilitate installation of the stabilizer bar.

3. The stabilizer bar of claim 1, further comprising a grease nipple associated with said bearing member.

4. The stabilizer bar of claim 1, further characterized in that said first and second telescoping sections and said sleeve member are fabricated from rectangular tubing.

5. The stabilizer bar of claim 1, further characterized in that said bearing member has a generally cylindrical configuration, the axis of which is positioned substantially vertically when said first and second telescoping sections are disposed substantially horizontally.

* * * * *